March 23, 1965 — C. H. SLOAN — 3,174,623
WATER SOFTENER
Filed April 6, 1961
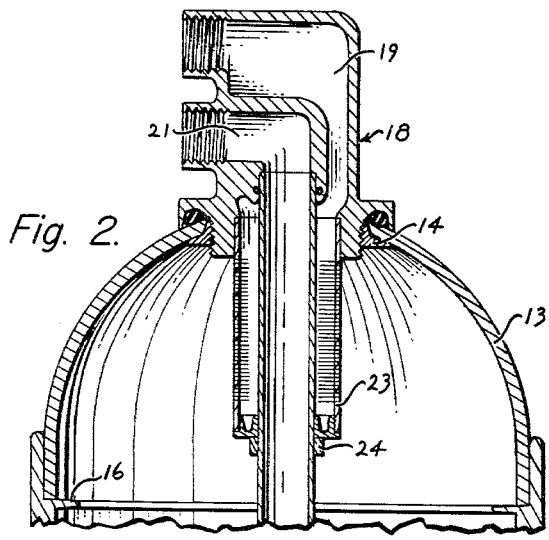
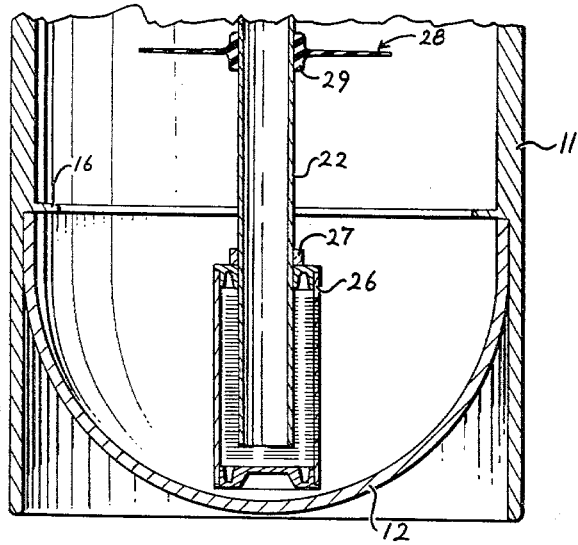
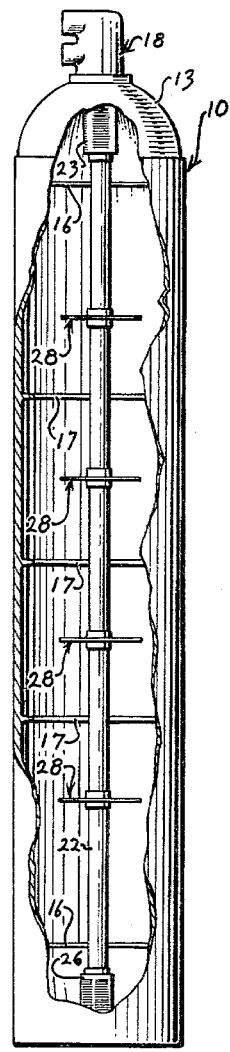
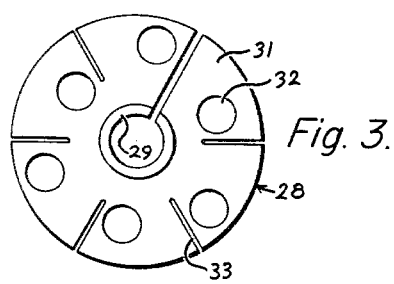
INVENTOR.
CHARLES H. SLOAN
BY
ATTORNEY

United States Patent Office 3,174,623
Patented Mar. 23, 1965

3,174,623
WATER SOFTENER
Charles H. Sloan, 1923 W. Holly St., Phoenix, Ariz.
Filed Apr. 6, 1961, Ser. No. 101,108
3 Claims. (Cl. 210—285)

My invention relates in general to water softeners; and more in particular to a water softener using a base exchange material and having much greater efficiency than similar water softeners of the prior art.

The terms "soft" and "hard" as applied to water and the practice of converting hard water into soft water have various connotations. A very common characteristic of "hard" water, however—and this condition may be taken as illustrative for the purpose of the present invention—is the presence of inorganic compounds which are not freely soluble in substantial proportions in water and have a tendency to separate out when the water is heated or used for various purposes such as for washing. Hard waters are also characterized by the fact that soap and hard water do not lather freely to produce good suds and provide a good cleaning action. Illustrative of types of compounds found in hard water are calcium carbonate and magnesium carbonate, although it should be understood that the present invention is not particularly concerned with the type of hard water, but rather with equipment for treating so-called "hard" water. Illustrative of the treatment of hard water to render it soft is the passage of such water through a bed of material, commonly called base exchange material, which contains ions such as sodium ions which will replace calcium and magnesium ions in the hard water and thus render it "soft." When the base exchange material has used up substantially all of its sodium or the like ions, it is normally regenerated by one of several means such, for example, as bringing into contact with it common salt in the form of brine—or other alkali metal halogen as may be indicated—in order to replace the calcium and magnesium ions with sodium ions in a reverse type process called regeneration.

While water softening installations may take various forms, the type of system commonly used in relatively small establishments such as in homes and in small factories may be taken as illustrative. In such systems the base exchange material, which may be of various types, is supported in a relatively narrow generally tubular tank, and water to be softened is passed through the tank from one end to another so as in theory to percolate longitudinally through the entire bed of base exchange material to thereby thoroughly soften the water. Periodically brine from another tank is passed through the base exchange material slowly and in the opposite direction to remove all of the hard water cations and replace them with sodium ions to thus produce compounds more soluble in water and thereby producing the effect of softness. I have found that the theoretical softening action from a given bed of base exchange material is not obtained in actual practice. This failure of a practical installation to attain theoretical results is usually attributed to too fast movement of water through the water softening tank with the result that there is insufficient time for the base ion exchange. In the actual construction of water softening systems it is a common practice to provide a tank with a collector tube and with a diffuser unit at the top and a collector unit at the bottom, so that theoretically the water moves uniformly through the entire bed of base exchange material. I have determined by test, however, that a very definite channelling action occurs, particularly when the collector tube has a glossy exterior surface and the tank in which it is contained has a smooth interior surface, so that much of the base exchange material is unaffected by water flow.

The principal object of my invention, therefore, is the provision of an improved water softening system.

Another object is the provision of an improved water softening system in which maximum softening action is obtained through a given bed of base exchange material.

Still another object of my invention is the provision of an improved water softening system in which substantially complete regeneration of the base exchange material occurs during the regeneration cycle.

A further object of my invention is the provision of an improved simplified water softening system in which channelling and leakage are prevented both during the normal flow of water therethrough and during the regeneration cycle.

Other specific objects and features of the invention will be apparent from consideration of the following detailed description taken with the accompanying drawings, wherein:

FIG. 1 is an elevational view, partly broken away, showing a preferred form of water softening system produced in accordance with the present invention;

FIG. 2 is an enlarged longitudinal vertical sectional view taken through FIG. 1 with the center portion of the view broken away to conserve space, and FIG. 3 is an enlarged plane view showing a preferred form of baffle used in accordance with the present invention.

Referring now to the drawings, I employ a suitable tank 10 having a spun center section 11, a rounded bottom portion 12, a top 13 and a threaded top opening 14. Tanks of this type may take various forms and may be constructed of various materials, but I prefer a fiberglass type material which in spinning may leave a plurality of inner flanges 16 and 17. In producing tanks of this general type rough flanges generally corresponding to the flanges 16 are commonly left during the spinning operation. The present practice is to trim these flanges off smoothly so that a smooth inner surface will result. These flanges are rough and unfinished, and they may remain in place in accordance with my invention because they are suitable for the purpose. Preferably also I provide additional flanges 17, although it may be sufficient in many instances to leave only the top and bottom flanges 16. Any suitable means for breaking up the inner smooth surface of the tank will facilitate both the water purifying step and the regenerating cycle when the tank is used.

The threaded opening 14 is closed by a suitable head 18 having an inlet passageway 19 and an outlet passageway 21. For the present purpose I have shown the head 18 of simple construction, those skilled in the art understanding that there are various types of head of this sort in the industry forming means for the introduction and removal of water and/or brine when the flow is reversed, together with various control devices, with none of which devices however my invention is concerned.

A collector tube 22 is frictionally secured in the head 18 to have its interior in communication with the passageway 21. A diffuser head 23 surrounds the top of the collector tube 22 and is positioned by a ring 24 normally integral with the collector tube. The diffuser head 23—sometimes also called a water spreader—is frictionally held in the head 18 so as to receive water from the passageway 19. The collector tube is open at its bottom and has a collector head 26 surrounding its bottom end and positioned by a ring 27, which is also normally fixed on the collector tube 22.

The diffuser or water spreader and collector both are provided with a relatively large number of parallel and spaced saw kerfs forming openings through which the water may move in either direction. Normally this arrangement of collector tube, diffuser or water spreader at the top and collector at the bottom forms the entire inner control means for the water. The construction is based on the assumption that water will diffuse outwardly and move more or less as a solid stream the full width of the tank, and downwardly through such tank so that it will come in contact with substantially all of the base exchange material in the tank. This theory appears to be further supported by the fact that normally the base exchange material will occupy approximately only that portion of the tank whose sides are parallel. In other words, normally there is no base exchange material in the inwardly sloping top portion 13. In general these assumptions appear to be reasonable because a functional relatively small tank for use in a home having a six inch inside diameter will generally be about three-and-a-half to four feet high. I have found that notwithstanding these dimensions there is a definite channelling action along the relatively smooth exterior wall of the collector tube 22, particularly when there is a fast draw down of water.

I have accordingly solved this problem by providing a number of baffles 28 placed in spaced relation on the collector tube, so that water must at each baffle flow around such baffle and thus avoid any possibility of channelling or leakage along the smooth surfaces of the collector tube. Preferably the baffles are formed of relatively thin membranous material, such as suitable semi-hard plastic, with a center annulus 29 secured as by plastic welding to the exterior surface of the collector tube. The plane circular portion 31 of the baffles has a plurality of randomly placed holes 32 and a plurality of edge slots 33 which may either be radial as shown or may also be randomly positioned. By locating the holes 32 non-symmetrically or in a random manner with respect to the axis of the baffle 28, there is little possibility of channelling taking place in paths defined by the location of such holes.

The baffles may be of various size, but preferably are of the order of half the diameter of the tank in which they are placed. This depends somewhat on circumstances. In a tank having a six inch diameter the baffles may easily be three to five inches in diameter because the top opening 14 is generally of the order of two-and-a-quarter inches in diameter, and the slots 33 will easily permit collapsing of a five inch baffle for passage through a two-and-a-half inch opening. Actually, however, in the case of a narrow tank, good results are obtained if the baffles are no wider than the width of the opening or even very much smaller than the width of the opening through which they are introduced. I have found, however, that in a twelve inch tank, for example, the baffles should be of the order of five inches or six inches for best results. The number, length and positioning of the slots 33 should, of course, be such as to permit the baffle being passed through the regular top opening and expanding out to substantially planular condition, so that it may perform its function.

The baffles may be produced and attached to the collector tube in various ways. If the rings 24 and 27 are already in position on the collector tube, then the baffles may have one of the slots 33 extending entirely into the center opening so that the baffle may be inserted around the tube and then secured in position. Suitably, however, the baffles may be positioned on the collector tube in the process of its manufacture.

I have found that even with a very fast draw using the structure of the present invention, substantially full and complete softening action occurs. In some respects, however, possibly still more important I find that in the limited time during which regeneration takes place, the brine is caused to enter into contact with all of the base exchange material and much better regeneration occurs in a given length of time. This feature of having better contact between the water and/or brine and the base exchange material can be taken advantage of in many ways suitably by greatly improved performance in a given installation. Under certain circumstances, however, I have found it possible to utilize a somewhat smaller tank and amount of base exchange material in a given installation than would normally be required without the present invention.

While I have shown and described a specific embodiment of the present invention, the scope of the invention is defined by the claims.

I claim:

1. In a water softener, a tank with a closed bottom and top with a central opening therein, a head secured in said opening having inlet and outlet passageways, a collector tube suspended from said head, with its interior in communication with said outlet passageway, a tubular collector surrounding said tube at its bottom end and lying near the tank's bottom, said collector having a plurality of parallel and spaced kerfs forming openings through said collector, and a diffuser surrounding said tube at its top and in communication with the inlet passageway, said diffuser having parallel spaced kerfs forming openings in the diffuser side walls and a plurality of spaced baffles secured to the collector tube between said collector and diffuser, each such baffle having a diameter larger than the said top opening of the tank and having a plurality of generally radial edge slots to permit collapsing of the baffles to pass them through the said tank opening, said baffles being formed of resilient material so that when they pass through said opening they will spring back to form substantially a planular structure.

2. A water softener as defined in claim 1, wherein said tank has a plurality of generally annular baffles projecting from its inside surface.

3. A water softener as defined in claim 1 wherein said baffles secured to the collector tube have a plurality of randomly spaced holes therein.

References Cited in the file of this patent

UNITED STATES PATENTS

| | | |
|---|---|---|
| 2,027,400 | Pennebaker | Jan. 14, 1936 |
| 2,723,761 | Van der Made et al. | Nov. 15, 1955 |
| 2,973,097 | Snider | Feb. 28, 1961 |